United States Patent Office 3,577,243
Patented May 4, 1971

3,577,243
PROCESS OF EXTRACTING MEAT FROM CRABTAILS
Peter W. Bynagte, San Diego, Calif., assignor to Westgate-California Foods, Inc., San Diego, Calif.
No Drawing. Filed Oct. 17, 1968, Ser. No. 768,503
Int. Cl. A22c 29/00; A23l 1/33
U.S. Cl. 99—111                                5 Claims

ABSTRACT OF THE DISCLOSURE

The process of extracting the meat from crabtails wherein the crabtails are dipped into a solution of salt water, sodium acid pyrophosphate or calcium acid pyrophosphate and sodium tripolyphosphate for a period of at least two minutes during which time the solution is agitated and then removing the meat from the crabtails and pre-cooking the meat in boiling water.

BACKGROUND OF THE INVENTION

Crabtails and the crab meat therein have in the past, normally been discarded as waste by processers because the difficulty in removing the meat makes its recovery uneconomical. Yet there is approximately 2 to 3 ounces of usable crab meat between the skin and the shell in crabtails that is recoverable as a unit. Therefore it is advantageous to have a process for economically recovering the crab meat in crabtails.

SUMMARY OF THE INVENTION

In the process of this invention, the crabtails, that are normally removed by breaking or the like from the body of the crab, are placed in a solution comprising salt water, sodium acid pyrophosphate or calcium acid pyrophosphate and sodium tripolyphosphate. The percentage of the parts of the solution range from 2 percent to 30 percent by weight of sodium acid pyrophosphate or calcium acid pyrophosphate, 2 percent to 15 percent by weight of sodium tripolyphosphate with the remainder comprising salt water or fresh water having a sodium chloride content of approximately 3 percent by weight of the water. For best results the bath is in moderate motion during immersion of the crabtails which may be accomplished by a circulating pump system or by other known agitating means. The crabtails are immersed in the solution for a period of time that is in excess of two minutes. The solution loosens the crab meat from the shell and skin. Upon removal from the solution, the crab meat is removed by breaking through the film of the intestine projection into the crabtail and grasping and pulling the crab meat out of the shell in substantially one piece. The crab meat is then pre-cooked in boiling water for approximately 12 minutes, which pre-cooks the crab meat and removes the solution therefrom. Thus the crab meat is quickly and easily removed from the shell by an economical process, which crab meat was formally lost as waste.

It is therefore an object of this invention to provide a new and improved process for recovering crab meat from crabtails.

It is another object of this invention to provide a new and improved process for recovering crab meat from crabtails that has a relatively short processing time, is economical, does not require complicated or expensive equipment or processes, and that removes the crab meat in substantially chunk form.

It is another object of this invention to provide a new and improved process of extracting meat from crabtails, that does not damage the crab meat recovered.

In the practice of this invention, a crabtail that is easily broke off from the body of the crab has a shell surface on the top and a skin surface on the inside with crab meat secured therebetween. The crabtails are broken off and placed in a bath that comprises a solution made of salt water or sea water, sodium acid pyrophosphate or calcium acid pyrophosphate, and sodium tripolyphosphate. The solution may contain sodium acid pyrophosphate or calcium acid pyrophosphate in concentrations ranging from 2 percent to 30 percent by weight. Sodium tripolyphosphate in the solution ranges from 2 percent to 15 percent by weight, and water having a salt solution of approximately 3 percent by weight of the water comprises the remainder of the solution.

The crabtails are placed in the solution for a period of time to release the crab meat from the shell structure and the heavy skin. It has been found that at least two minutes is required for accomplishing this, however, the crabtails may be left in the bath for longer periods of time, for example up to 24 hours, without damaging the recovered crab meat. In an economical application of the process, it is not desirable to leave the crabtails in the solution for periods as long as 24 hours.

To obtain best results, the solution is placed in moderate motion by a circulating pump, by rotating blades or by use of other suitable means. The crabtails are usually collected in wire baskets and are then placed in a dipping tank. In a continuous system, the tails are placed on a known conveyer that carries the tails submerged through the dipping tank with an immersion time of approximately 5 minutes. The ambient temperature of the fluid is normally that of atmosphere or of sea water.

The crabtails have an indentation of skin that received the intestines of the crab. After the crabtails are removed from the solution, a finger is placed in the indentation to break the membrane and make an opening to the crab meat. The crab meat is then grasped by the fingers and pulled out of the pocket of the shell and skin. The crabtails are then pre-cooked in boiling water, that may be salt water, for about twelve minutes. This pre-cooks the crabtails and also removes the solution from the crabtails. The crabtails, being in chunk form which is the most desirable form of recovered crab meat, may then be processed further in the known manner.

The following specific examples will serve to further illustrate the practice of the invention.

(I)

Sixty-five pounds of crabtails were placed in a circulating solution comprising by weight about 95 percent sea water, 3 percent sodium acid pyrophosphate and 2 percent sodium tripolyphosphate for about 5 minutes. The crabtails were then removed from the solution and the crab meat was removed from the shell and skin in about 1 hour. The recovered raw meat weighed 54.6 pounds. The crabtail meat was then pre-cooked in fresh water having about 3 percent sodium chloride by weight added thereto at a temperature of about 200° F. for about 12 minutes yielding 35.7 pounds of recovered crabtail meat.

(II)

Seventy and one-half pounds of crabtails were placed in a solution comprising by weight about 30 percent calcium acid pyrophosphate, 15 percent sodium tripolyphosphate and 45 percent salt water. The salt water comprised fresh water with about 3 percent by weight of sodium chloride. The crabtails were immersed in the solution for approximately 2 minutes and were then removed from the solution. The time required to remove the crab meat from the crabtails required about 1 hour and 16 minutes in which 51.7 pounds of cleaned raw crabmeat was recovered. The raw crabmeat was pre-cooked in salt water at a temperature of about 212° F. for about 10 minutes and produced 43.6 pounds of recovered crab meat.

(III)

Fifty and one-half pounds of crabtails were placed in a circulating solution comprising by weight about 15 percent calcium acid pyrophosphate, 7 percent sodium tripolyphosphate and 78 percent sea water for about 1 hour. The crabtails were then removed from the solution and the crab meat was removed from the shell and skin in about 50 minutes. The recovered raw meat weighed 40.3 pounds. The crabtail meat was then pre-cooked in fresh water having about 3 percent sodium chloride by weight added thereto and at a temperature of about 209° F. for about 15 minutes yielding 33 pounds of recovered crab meat.

The sea water or salt water solution catalyzes the action of the sodium acid pyrophosphate or the calcium acid pyrophosphate in dissolving protein that dissolves or substantially reduces the adherance between the crabtail meat and the skin and shell. The sodium tripolyphosphate inhibits the catalytic action between the sea water or salt water and the sodium acid pyrophosphate or calcium acid pyrophosphate after the solution has accomplished its purpose.

I claim:

1. The process of extracting meat from crabtails comprising,
   placing crabtails in a salt water solution including at least about 2 percent to 30 percent by weight of sodium acid pyrophosphate or calcium acid pyrophosphate and about 2 percent to 15 percent by weight of sodium tripolyphosphate for a time period of at least two minutes,
   removing said crabtails from said solution,
   and removing the meat from the crabtails.

2. The process of extracting meat from crabtails as claimed in claim 1 including,
   agitating said solution around said crabtails.

3. The process of extracting meat from crabtails as claimed in claim 1 in which,
   said salt water having about 3 percent by weight of sodium chloride.

4. The process of extracting meat from crabtails as claimed in claim 3 incluing the step of,
   boiling the removed crab meat in water for about 12 minutes to precook said meat and remove said solution.

5. The process of extracting meat from crabtails as claimed in claim 1 including the step of,
   breaking through the film of the intestine projection into the crabtail and pulling the crab meat out in substantially one piece.

References Cited

UNITED STATES PATENTS 2,297,411   9/1942   Henning _____ 99—111

RAYMOND N. JONES, Primary Examiner

R. M. ELLIOTT, Assistant Examiner